United States Patent [19]

Schrag

[11] Patent Number: 5,782,175
[45] Date of Patent: Jul. 21, 1998

[54] KNOTTER CLUTCH CONTROL FOR SQUARE BALERS

[75] Inventor: Thomas G. Schrag, Hesston, Kans.

[73] Assignee: Hay & Forage Industries, Hesston, Kans.

[21] Appl. No.: 920,687

[22] Filed: Aug. 29, 1997

[51] Int. Cl.⁶ .................................................. B65B 13/26
[52] U.S. Cl. .................... 100/4; 56/343; 100/19 R
[58] Field of Search ........................... 100/4, 17–24, 100/179; 56/341, 343

[56] References Cited

U.S. PATENT DOCUMENTS

| | | | |
|---|---|---|---|
| 2,807,204 | 9/1957 | Eby et al. | 100/23 |
| 2,859,687 | 11/1958 | Hill | 100/23 |
| 2,981,173 | 4/1961 | Nolt | 100/4 |
| 3,129,654 | 4/1964 | Locker et al. | 100/4 |
| 3,195,443 | 7/1965 | Hollyday | 100/4 |
| 3,448,681 | 6/1969 | Nolt et al. | 100/4 |
| 3,895,571 | 7/1975 | Freeman | 100/4 |
| 4,074,623 | 2/1978 | White | 100/19 R |
| 4,117,775 | 10/1978 | White et al. | 100/19 R |
| 4,142,746 | 3/1979 | White | 100/19 R |
| 4,604,858 | 8/1986 | Esau et al. | 100/19 R |
| 5,058,495 | 10/1991 | Van Den Bossche et al. | 100/4 |
| 5,156,085 | 10/1992 | Bossche | 100/4 |

*Primary Examiner*—Stephen F. Gerrity
*Attorney, Agent, or Firm*—Hovey, Williams, Timmons & Collins

[57] ABSTRACT

The knotter clutch control prevents the driven dog of the clutch from flipping out into its actuated position for engagement with the driving lug of the clutch unless the lug is in a position wherein positive driving engagement between the lug and the dog is assured. A strategically positioned control lobe on the cam ring of the drive sprocket for the clutch blocks release of the dog into its extended position when the driving lug is at the lug pickup point on its path of travel. The dog is free to be released when the lug is at all other positions on its path of travel so as to be in position for engagement with the lug when it next arrives at the pickup point. The dog is reset into its retracted position after a single revolution of the knotter drive shaft.

9 Claims, 4 Drawing Sheets

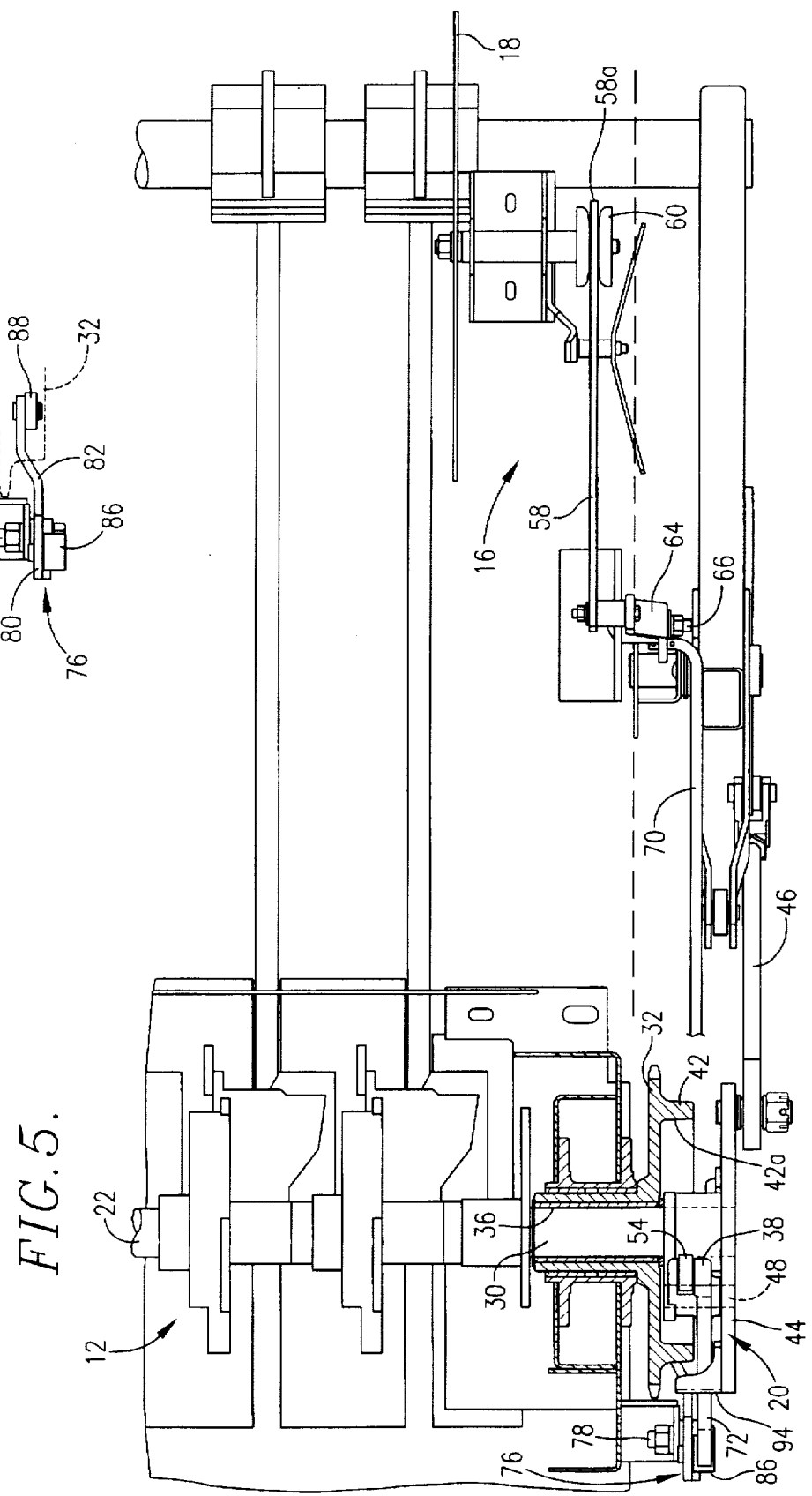

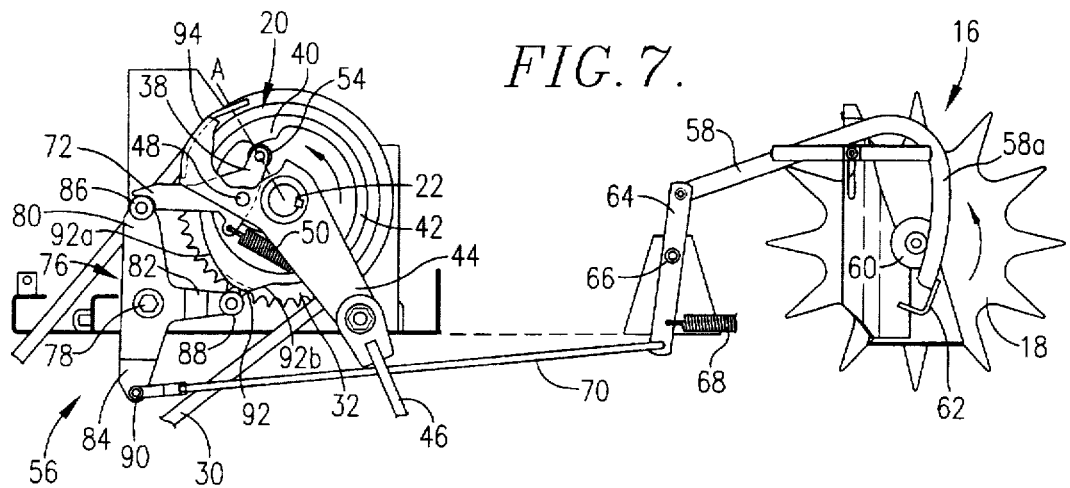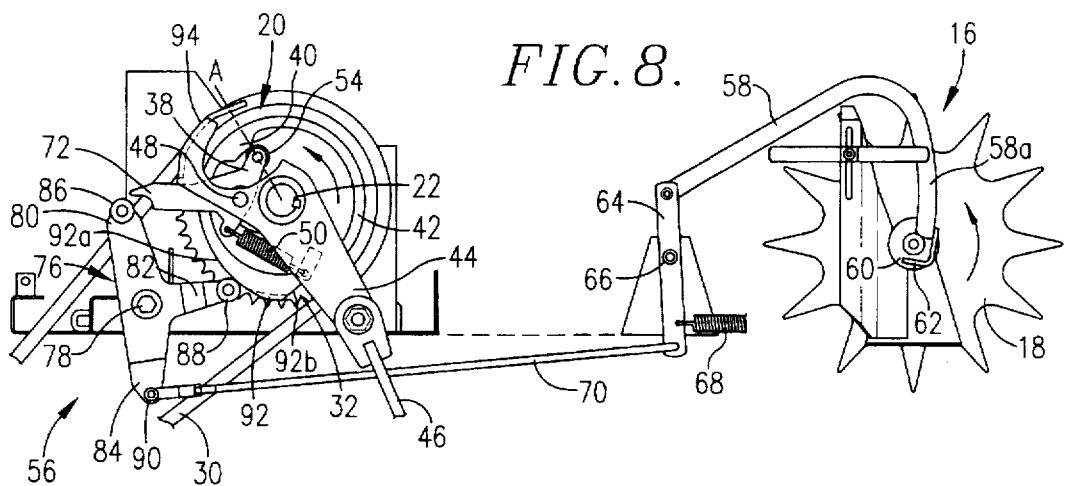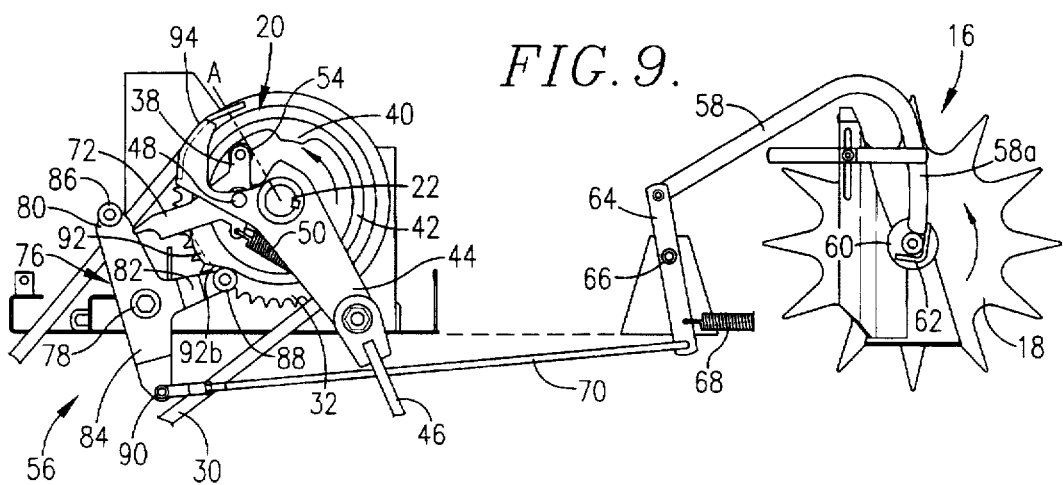

KNOTTER CLUTCH CONTROL FOR SQUARE BALERS

TECHNICAL FIELD

This invention relates to that class of crop balers commonly referred to as "square" balers and, more particularly, to improvements associated with the clutch that activates the knotter and twine needles from time-to-time as bales reach full size in the machine.

BACKGROUND

Square balers have used so-called "dog" clutches for many years as a means of temporarily connecting the knotters and twine needles with the drive mechanism of the baler to carry out the tying cycle after the bale reaches a predetermined length. However, with a dog clutch of the type heretofore used in the Hesston Model 4900 and the Case Model 8580 big square balers, the clutches may sometimes accidentally slip out of engagement in mid-cycle. This can cause the twine needles to remain inside the baling chamber as the plunger begins depressing the next charge of hay toward the rear of the chamber, causing the needles to be destroyed or at least seriously damaged.

Such slippage occurs when the driving lug associated with the clutch fails to completely and positively engage the driven dog of the clutch. Instead of pushing the dog around in a complete circle for one revolution of the knotter mechanism, the partially engaged lug slips off the dog part way through the cycle, disengaging the clutch and leaving the needles stranded inside the bale chamber.

The lug is continuously driven about a circular path of travel throughout the baling process and only engages the dog if the dog has first been flipped out into an extended position in the path of travel of the lug, which occurs when the bale reaches its full length. Prior to the bale reaching full size, the dog remains retracted and the lug simply orbits ineffectually in its circular path of travel without making driving contact with the dog.

In the intended mode of operation, the dog is always "picked-up" by the driving lug at the same point (the "pickup point") on the lug's path of travel, and is always released at that point after one full revolution of the dog. Ideally, therefore, to assure that the lug and the dog will make full contact with one another, the dog is flipped out to its extended position well in advance of the driving lug reaching the pickup point. However, because actuation of the dog into its extended position is a function of when the bale reaches full length instead of where the lug is in its path of travel, the bale could actuate the dog at any time during a revolution of the driving lug. The lug could be at any number of possible locations on its circular path of travel. Often, the dog may actuate just as the lug is passing the dog at the pickup point. When that happens, the dog may only "nick" the corner of the lug such that the lug fails to get firmly and squarely seated behind the dog to push it all the way around the circle. Accordingly, although the contact might be sufficient to move the dog at first, the lug might slip off before completing a full knotter cycle.

Many different types of needle safeties have been available for assuring that the needles are pulled back out of the bale case in the event of a breakage in the driveline or malfunction of the dog clutch to avoid damaging the needles with the oncoming plunger. See for example U.S. Pat. No. 4,117,775 titled Tying Needle Safety Control for Crop Balers assigned to the assignee of the present invention. Even with a safety of the type disclosed in the '775 patent, however, it is possible under just the right circumstances for the safety to be unable to pull the needles back out of the bale case in time to avoid damage. For example, with the needles fully inserted into the bale chamber and their operating crank disposed in its top-dead-center position, the needle safety of the '775 patent cannot withdraw the needles from the chamber.

SUMMARY OF THE INVENTION

Accordingly, one important object of the present invention is to provide improved reliability and performance in a knotter dog clutch assembly for use in connection with square balers. Pursuant to this objective, another important object of the invention is to eliminate the partial clutch engagement problem of the past in which engagement of the dog with only the front corner of the driving lug has sometimes led to the clutch becoming accidentally disengaged part way through a tying cycle. A further important object is to provide a solution to the problem that does not require complete redesign of the clutch and control assembly and can readily be retrofitted onto existing machines.

These objects and others not specifically set forth above are obtained in the present invention by making it impossible for the dog to be actuated into the extended position when the driving lug is at the pickup point in its circular path of travel. In other words, before the dog can be extended into the path of travel of the lug, the lug must be either approaching the pickup point from some distance or completely past the pickup point, but not at the pickup point. This assures that the dog can be fully shifted into its extended position without interference from the lug, thus placing the dog in perfect position for engagement with the lug the next time the lug passes the pickup point.

The driven dog is held in its normal retracted position by a releasable retainer. The retainer is operably coupled with the bale length sensor so that, when the bale reaches the appropriate length, the sensor trips the retainer, releasing the dog to be spring-actuated into its extended position. However, if the bale length sensor attempts to trip the retainer when the driving lug is at the pickup point, the retainer cannot be released due to engagement of a follower on the retainer with a special cam lobe on the constantly rotating sprocket of the knotter drive mechanism. Once the lobe has moved past the follower by an amount that corresponds to sufficient movement of the lug past the pickup, the retainer is free to trip, causing the dog to flip out to its extended position. A reset cam associated with the crank arm for the needles returns the retainer to its retaining position part way through the knotter cycle.

BRIEF DESCRIPTION OF THE DRAWINGS

FIG. 5 is an enlarged, fragmentary, top plan view of the knotter "stack", clutch and associated mechanism with parts of the knotter drive being shown in cross section for clarity;

FIG. 6 is an enlarged, fragmentary top plan view of the releasable retainer for the driven dog of the clutch;

FIG. 7 is a fragmentary side elevational view of the clutch and its control illustrating how a cam lobe prevents the retainer from becoming released when the driving lug is at the pickup point;

FIG. 8 is a fragmentary side elevational view of the mechanism similar to FIG. 7 but showing how the retainer can be released once the driving lug is past the pickup point; and FIG. 9 is a fragmentary side elevational view of the mechanism showing how the retainer can be released when the driving lug is approaching but not yet at the pickup point.

DETAILED DESCRIPTION

Figure 1:
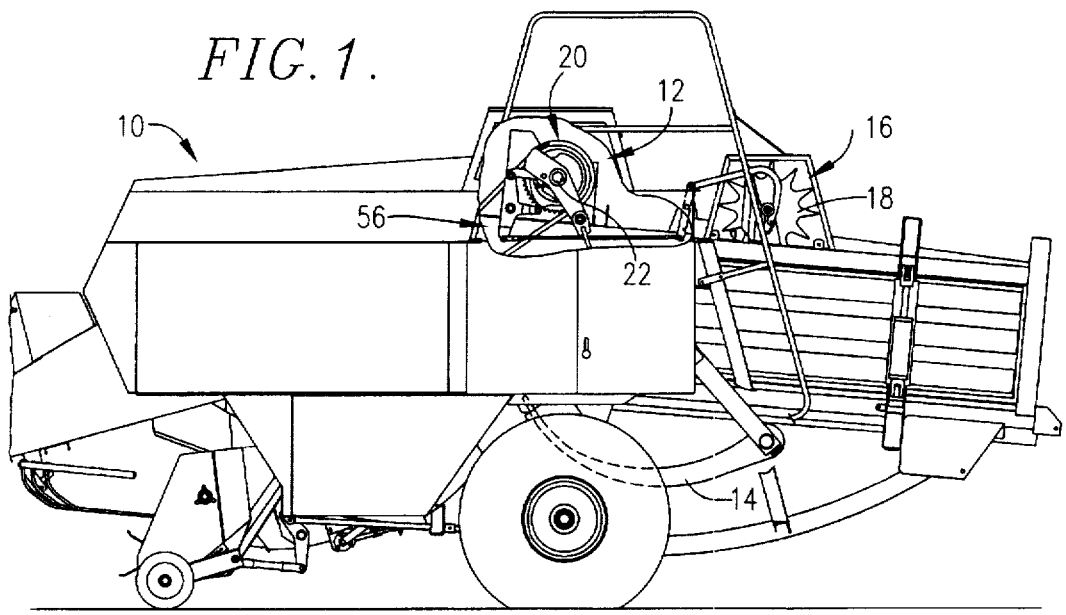
FIG. 1 is a fragmentary side elevational view of a square baler incorporating a knotter clutch control constructed in accordance with the principles of the present invention.

The baler 10 shown for purposes of illustration in FIG. 1 is a big square baler capable of producing bales on the order of 2,000 pounds or more. However, it will be appreciated that the principles of the present invention may be utilized in connection with smaller balers, if desired. Moreover, such balers need not be of the illustrated "extrusion" type of square baler in which the new bales are progressively forced out the rear end of the machine through a restricted orifice.

As will be readily apparent to those skilled in the art, the baler 10 has a series or "stack" of knotters 12 (see also FIG. 5) at the top of the baler which cooperate with twine needles 14 from time-to-time to place strands of twine around a finished bale, to form a secure knot in the opposite ends of each twine strand, and to cut the twine from the tied bale. Generally speaking, a bale length sensor 16 including a starwheel 18 determines when a bale has reached full length, engages a clutch 20 associated with the knotter stack, and causes the knotters 12 to actuate for one single revolution of a drive shaft 22, whereupon the clutch 20 is disengaged until the next bale reaches the appropriate length. During each knotter cycle, the needles 14 swing across the bale chamber located inside the baler 10 to present the ends of twine strands to the knotters 12 for manipulation thereby. A needle safety 23 (FIG. 4) of the type disclosed in U.S. Pat. No. 4,117,775 is coupled with the needles 14.

Figure 4:
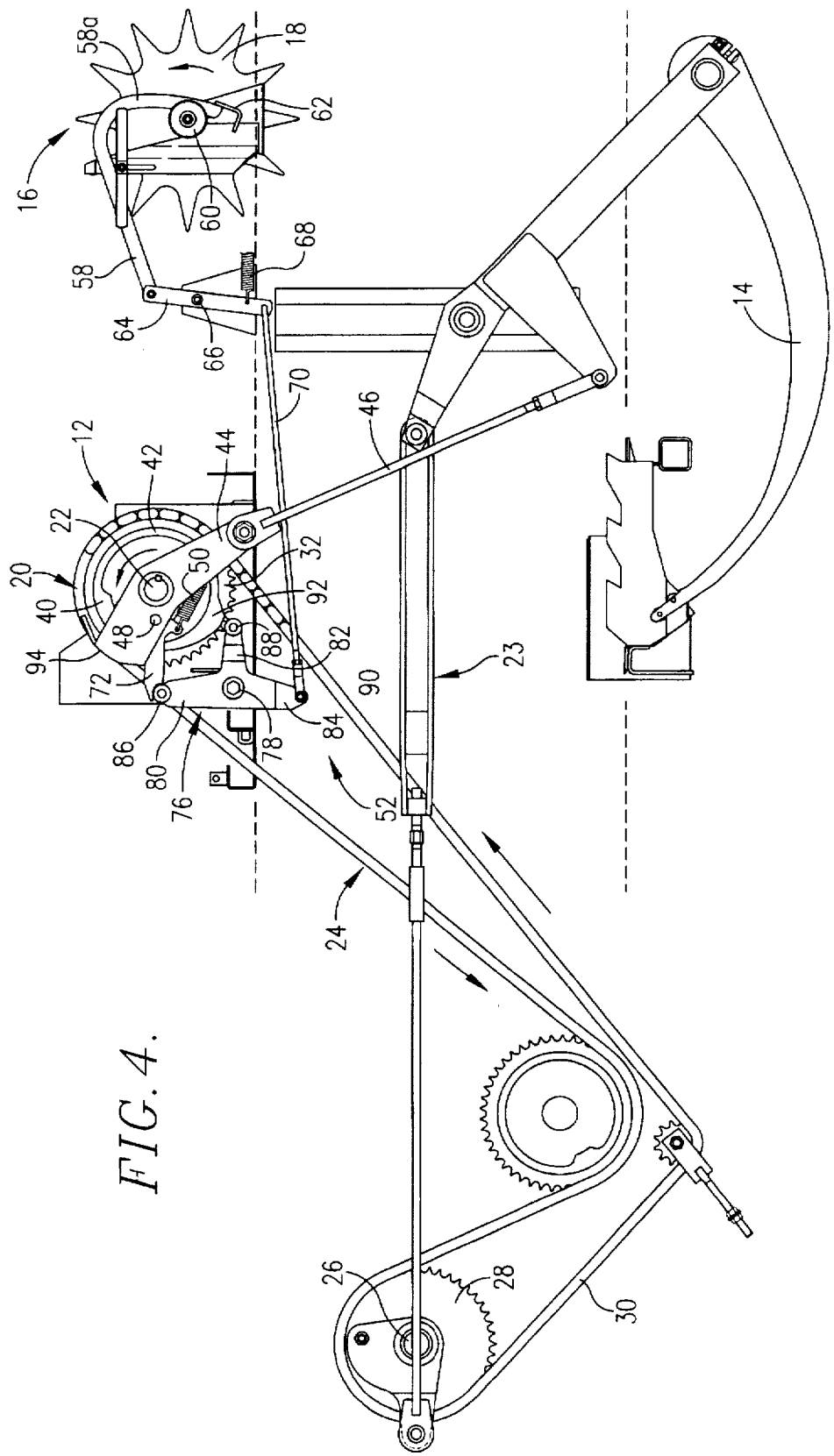
FIG. 4 is a side elevational view of the knotter drive, clutch, clutch control, and needles isolated from the baler itself.

As illustrated for example in FIG. 4, the knotters 12 are supplied operating power through a chain drive assembly 24 that is constantly in motion. A constantly rotating input shaft 26 drives a sprocket 28 which in turn drives a chain 30 looped around a sprocket 32 up at the knotters 12. As shown in FIG. 5, the sprocket 32 is rotatably mounted on the knotter shaft 22 by a bushing 36 so that, although the sprocket 32 rotates continuously, the knotter shaft 22 does not.

The clutch 20 functions to operably interengage the chain drive assembly 24 and the knotter shaft 22 for one revolution of the knotter shaft 22 when the clutch 20 is engaged. As its primary components, clutch 20 includes a dog 38 mounted on the knotter shaft 22 and a driving lug 40 mounted on the sprocket 32. The lug 40 is part of a circular cam ring 42 projecting outwardly from and integral with the outer face of the sprocket 32. The ring 42 is concentrically disposed about the axis of rotation of the knotter shaft 22 and has an inner, annular surface 42a that is completely concentric with the knotter shaft 22 except at the driving lug 40, where the surface 42a protrudes radially inwardly and is truncated to present the lug 40.

Figure 3:
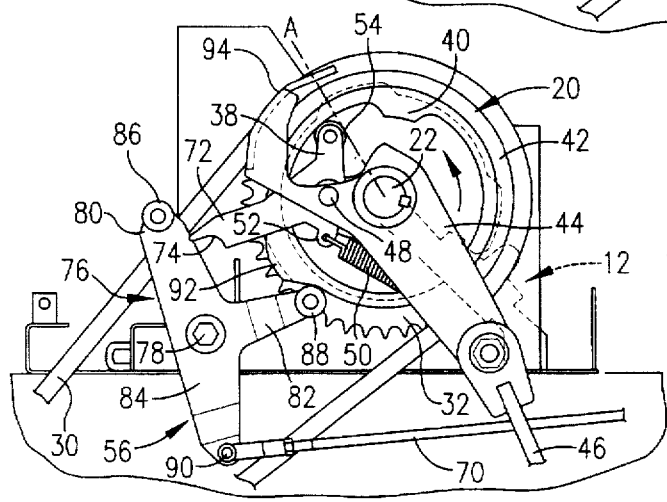
FIG. 3 is an enlarged, fragmentary side elevational view similar to FIG. 2 but illustrating the improved clutch control of the present invention, the clutch dog being illustrated in its extended position for pickup by the driving lug at the eleven o'clock pickup point.

The clutch 20 also includes a crank arm 44 that is fixed intermediate its opposite ends to the knotter shaft 22 and extends entirely across the face of the sprocket 32. The crank arm 44 has one end operably connected with a linkage 46 for actuating the needles 14, while the opposite end of the crank arm carries the dog 38. As illustrated best in FIGS. 3 and 7–9, the dog 38 is pivoted to the crank arm 44 by a pivot 48 and is swingable between an extended position illustrated in FIG. 3 and a retracted position illustrated, for example, in FIGS. 7 and 8.

A coil spring 50 forms another part of the clutch 20 and is connected between the crank arm 44 and a tab 52 on the lug 38 to yieldably bias the lug 38 toward its extended position in which a roller 54 at the outer end of the dog 38 rides along the 20 inner annular surface 42a of the ring 42. When the dog 38 is in its extended position of FIG. 3, for example, it is located within the circular path of travel of the constantly moving lug 40, but when the dog 38 is in its retracted position of FIGS. 7 and 8, the dog 38 is not within the path of travel of the lug 40.

The clutch 20 is engaged and disengaged by a control broadly denoted by the numeral 56. The bale length sensor 16 forms a part of such control and includes the starwheel 18 that penetrates into the top surface of the bale inside the baler and rotates one additional increment of angular movement during each segment of additional rearward travel of the forming bale. In addition to the starwheel 18, the bale length sensor 16 includes an inverted, generally L-shaped arm 58 that is generally looped up and over a hub 60 of the starwheel 18. The exterior of the hub 60 is corrugated to make frictional driving engagement with the inside surface of the downwardly projecting leg 58a of the L-arm 58. Thus, when the starwheel 18 rotates, the leg 58a is driven upwardly by the rotating hub 60 until the hub 60 drops off the leg 58a into the dropoff socket 62 (as shown in FIGS. 8 and 9).

The bale length sensor 16 further includes a generally upright lever 64 pivoted intermediate its ends to the frame of the baler by a pivot 66. The upper end of the lever 64 is pivotally connected to the forward end of the L-arm 58, while the bottom end of the lever 64 is connected to a spring 68 that yieldably biases the lever 64 in a counterclockwise direction viewing FIGS. 7, 8 and 9. The spring 68 helps maintain the leg 58a of the lever 58 in frictional engagement with the hub 60 during rotation of the starwheel 18.

The bale length sensor 16 further includes a relatively long, fore-and-aft rod 70 that is coupled with the lower end of the lever 64 for transmitting operating motion of the lever 64 forwardly to other components of the control 56. As will be seen, once the proper bale length has been detected by the sensor 16 and the driving lug 40 is in a position where it does not interfere with actuation of the dog 38, the spring 68 will function to pull the rod 70 rearwardly to engage the clutch 20.

In addition to the bale length sensor 16, the control 56 for the clutch 20 includes a lever 72 fixed to the dog 38 and projecting radially outwardly from the pivot 48. The lever 72 has a downwardly facing notch or seat 74 in its outer end.

The control 56 further includes a generally T-shaped retainer 76 for releasably holding the dog 38 in its retracted position. Retainer 76 is mounted on the frame of the baler for rocking movement about a transverse pivot pin 78 and has three generally radially extending legs 80, 82 and 84 whose longitudinal axes intersect at the pivot pin 78. The outer end of the leg 80 carries a roller 86 that is complementally receivable within the seat 74 of lever 72, the outer end of the leg 82 carries a follower roller 88 that is disposed in closely spaced relation to the outside of the ring 42 on sprocket 32, and the outer end of the leg 84 is connected to the front end of the rod 70 via a pivot pin 90. The retainer 76 is normally maintained by the bale length sensor 16 in a retaining position such as shown in FIG. 7 where the roller 86 is received within the seat 74 but can be rocked by the spring 68 in a counterclockwise direction at appropriate times so as to assume a releasing position out from under the lever 72 as shown in FIGS. 8 and 9.

The control 56 additionally includes special control structure in the form of a cam lobe 92 on the outside surface of the ring 42. The high spot on lobe 92 is located approximately 130° from the driving lug in the counterclockwise direction in such a position that when the lug 38 is at the pickup point "A", the lobe 92 is directly under the follower 88. Lobe 92 at its high point is approximately the same width in the circumferential direction as the lug 40, although the follower starts to leave the lobe along its trailing, gently inclined face 92a before the dog 38 fully leaves the lug 40 as shown in FIG. 8. The leading face 92b of the lobe is more steeply inclined than the trailing face 92a so that the retainer 76 can quickly snap into its released position when the need arises.

The final component of the control 56 is a reset device in the form of a cam 94 carried on the needle crank arm 44 at its end opposite the linkage 46. The reset cam 94 comprises an inturned portion of the crank arm and wraps part way around the axis of the knotter shaft 22 for approximately 30°. The radial position of cam 94 is such that the follower 88 will engage its radially outer, ramp-like surface if the retainer 76 is in its released position when the cam 94 is in a seven o'clock position. The progressive ramp-like action of the cam 94 urges the follower 88 of the retainer outwardly in a clockwise direction to reset the retainer. Reset cam 94 is so located with respect to dog 38 that when the dog and lug are first engaged, the reset cam trails the lobe 92 by an amount sufficient to allow the retainer to remain released for several degrees of rotation of the sprocket 32.

OPERATION

As one plunger stroke after another takes place inside the baler, the bale progressively inches its way rearwardly to slowly rotate the starwheel 18 of the length sensor 16 in a counterclockwise direction viewing FIGS. 7–9, for example. The sprocket 32 of the knotter chain drive 24 continuously rotates, and the lug 40 continuously moves in its circular path of travel around the knotter shaft 22, which is stationary at this time. The retainer 76 holds the dog 38 in its retracted position through the lever 72 such that the lug merely passes by the dog 38 at the eleven o'clock pickup point "A" without engaging the dog. The L-arm 58 of the length sensor climbs progressively higher and higher on the hub 60 to bring the dropoff socket 62 progressively closer to the hub 60.

When the dropoff socket 62 reaches the hub 60 as shown in FIG. 9, the socket accepts the hub and allows the entire L-arm 58 to be displaced slightly forwardly toward the knotter 12 by the action of the tension spring 68 as it rotates the upright lever 64 counterclockwise. This snaps the retainer 76 counterclockwise into its releasing position of FIG. 9 (assuming the lug 40 is not at pickup point "A") to correspondingly pull the roller 86 out from underneath the lever 72. Spring 50 then pulls dog 38 counterclockwise into its extended position of FIG. 9 where it awaits the oncoming lug 40. Once the lug engages the dog 38 at pickup point "A", it pushes the entire assembly consisting of the dog 38, the crank arm 44, and the knotter shaft 22 in a counterclockwise direction about the axis of the shaft 22 to drive the needles 14 and the knotters 12 through their respective operating cycles. Because the retainer 76 becomes reset by the reset cam 94 shortly after revolution of the crank arm 44 commences, the roller 86 of retainer 76 is waiting for the lever 72 in its path of travel as the lug nears the completion of just one revolution after engaging the dog 38. The awaiting roller 86 catches in the seat 74 of the lever 72 and forces the dog clockwise out of engagement with the lug 40. In the meantime, because the reset cam 94 has turned the retainer 76 clockwise, the lever 64 of length sensor 16 has also been turned clockwise, pushing the L-arm 58 rearwardly a sufficient distance that the drop off socket 62 is removed from the hub 60. This allows the L-arm 58 to drop by gravity to reposition the hub 60 up along the leg 58a so that the length sensor 16 is reset for the next bale and the retainer 76 is held in its retaining position.

The foregoing description assumes that the retainer 76 trips when the lug 40 is either approaching the pickup point "A" as in FIG. 9 or has already passed by that point. However, if the sensor 16 attempts to trip the retainer 76 when the lug 40 is directly at point "A" as illustrated in FIG. 7, a different series of events takes place. In this respect, it will be noted in FIG. 7 that although the L-arm 58 in FIG. 7 is illustrated as being not quite ready to trip the retainer 76, even if the hub 60 were received by the dropoff socket 62 at this time, the retainer 76 would still not trip. This is due to the fact that the control lobe 92 in FIG. 7 is directly underneath the follower 88 on the retainer 76 at this time such that, even if the sensor 16 attempts to pull the retainer 76 counterclockwise, the lobe 92 will block inward movement of the follower 88. Thus, the spring 68 would merely continue to pull on the rod 70 until such time as the lobe 92 passed beyond the follower 88, whereupon the spring 68 could snap the retainer 76 counterclockwise to disengage the roller 86 from under the lever 72 of the dog 38. This condition is illustrated in FIG. 8 where the retainer 76 is tripped but the dog 38 is still in its retracted position because its roller 54 is riding on the truncated radially inner face of the lug 40. Once the lug 40 is past the roller 54, spring 50 snaps the dog 38 counterclockwise into its extended position so as to be ready for the lug 40 the next time it comes around to the pickup point "A".

Figure 2:
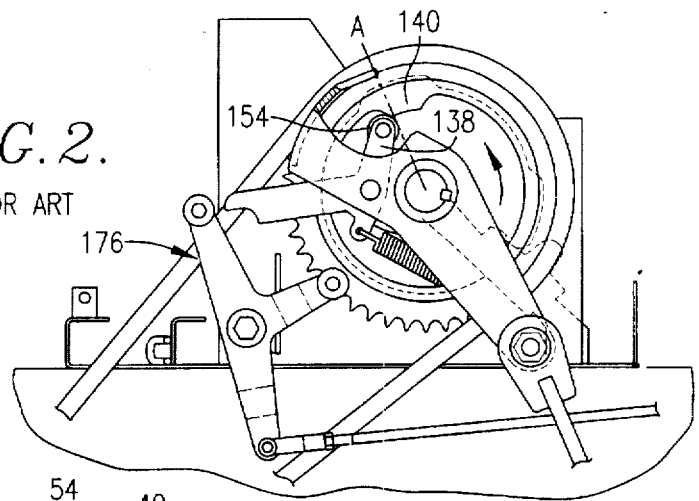
FIG. 2 is an enlarged, fragmentary side elevational view of a prior clutch illustrating how the driving lug may sometimes only partially catch the dog of the clutch, resulting in disengagement of the two parts midway through the knotter cycle.

This ability of the control 56 to keep the clutch 20 from engaging, or trying to engage, when the lug 40 is at the pickup point "A" eliminates the problem in the prior art of weak or partial engagement between the critical clutch components as illustrated in FIG. 2. That figure illustrates how, in the prior art, it was possible for the roller 154 of the dog 138 to catch on only the leading corner of the lug 140 if the retainer 176 released the dog 138 just as the lug 140 was arriving at the pickup point. Without the control lobe 92 of the present invention, nothing would keep the retainer 176 from tripping. Consequently, the roller 154 would sometimes fail to seat properly and later slip on up and over the lug 140 part way through the revolution.

It should also be noted that the gentle slope on the trailing face 92a of the cam lobe 92 is helpful in preventing damage to the clutch 20, control 56 and needles 14 in the event that the knotter chain drive is reversed for any reason, such as to unplug the baler. When the knotter chain drive 24 is reversed, the sprocket 32 is turned in a clockwise direction, thus bringing the lobe 92 under the follower 88 generally from right to left viewing FIGS. 7–9 for example. If the trailing face 92a were abrupt instead of gently sloped, and if the retainer 76 is in a tripped position, the lobe 92 might tend to catch on the follower 88 and force the retainer 76 counterclockwise toward an overcenter condition. This could break the retainer 76 and the clutch components and leave the needles stranded inside the bale case. By giving the trailing lobe face 92a a gentle slope, the lobe 92 has no opportunity to snag the follower 88 and invert the retainer 76.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, instead of the functions of the lobe 92 and the reset cam 94 being carried out by two separate structures as in the preferred embodiment, it is possible that the lobe 92 could be appropriately modified to carry out both functions in a single structure. In that event, the crank arm 44 would not carry a resetting cam.

The inventor hereby states his intent to rely on the Doctrine of Equivalents to determine and assess the reasonably fair scope of their invention as pertains to any apparatus not materially departing from but outside the literal scope of the invention as set out in the following claims.

I claim:

1. In a square baler having an intermittently operated knotter shaft that becomes operably connected with a continuously rotating drive sprocket during each knotter cycle, the improvement comprising:

a clutch including a dog mounted on the knotter shaft, a driving lug mounted on the sprocket and engageable with the dog at a pickup point on the path of travel of the lug for transferring driving power from the sprocket to the knotter shaft when the lug is engaged with the dog, a spring yieldably urging the dog toward an extended position in which the dog is disposed in the path of travel of the lug so that the lug engages the dog when the lug reaches the pickup point on its path of travel, said dog being holdable in a retracted position in which the dog is disposed out of the path of travel of the lug so that the lug passes by the dog when the lug reaches the pickup point; and a control for the clutch including a releasable retainer for holding the dog in said retracted position, a sensor responsive to the length of a bale forming in the baler for shifting the retainer to a released position when the bale reaches a certain predetermined length, a reset device for returning the retainer to a retaining position during a revolution of the knotter shaft and for causing the dog to disengage from the lug when the lug and the dog arrive back at the pickup point after completing the knotter cycle, and control structure for preventing the dog from moving from its retracted position to its extended position when the sensor determines that the bale has reached the predetermined length unless the moving lug is either beyond or approaching said pickup point.

2. In a square baler as claimed in claim 1,
said control structure being disposed to block the retainer from shifting to its released position when the lug is at the pickup point.

3. In a square baler as claimed in claim 1,
said control structure comprising a cam lobe on the sprocket and a follower on the retainer,
said cam lobe and the follower being so disposed that the cam lobe holds the retainer against shifting to its released position when the cam lobe and the follower are interengaged.

4. In a square baler as claimed in claim 3,
said sprocket and said knotter shaft having a common axis of rotation,
said sprocket having a cam ring disposed concentrically about said axis of rotation,
said cam ring having and inner surface and a outer surface,
said lug being disposed on said inner surface of the ring and said cam lobe being disposed on the outer surface of the ring.

5. In a square baler as claimed in claim 4,
said retainer being located outside of said cam ring and mounted for rocking movement between said retaining and released positions,
said dog having a retainer-engaging lever projecting outwardly beyond the cam ring and disposed for engagement with a projection on the retainer when the retainer is rocked to its retaining position,
said follower of the retainer being out of disposition for engagement with the cam lobe when the retainer is in its retaining position,
said follower of the retainer being disposed for engagement with the cam lobe when the retainer is in its released position and said projection being out of disposition for engagement with the lever of the dog.

6. In a square baler as claimed in claim 5,
said knotter shaft having an elongated crank arm fixed thereto intermediate opposite ends of the crank arm,
said crank arm extending across and intersecting said axis of rotation for movement with the knotter shaft about the axis of rotation,
said dog being carried on the crank arm on one side of said axis of rotation,
said crank arm having a link coupled therewith on the opposite side of said axis of rotation for operating a set of twine needles.

7. In a square baler as claimed in claim 6,
said resetting device being located on the crank arm on said one side of said axis of rotation generally adjacent to said dog.

8. In a square baler as claimed in claim 7,
said cam lobe having a relatively steeply inclined leading face and a relatively gradually inclined trailing face with respect to the normal direction of rotation of the sprocket.

9. In a square baler as claimed in claim 3,
said cam lobe having a relatively steeply inclined leading face and a relatively gradually inclined trailing face with respect to the normal direction of rotation of the sprocket.

* * * * *